United States Patent

[11] 3,626,036

[72] Inventors Wilhelm Sirrenberg
 Sprockhoevel;
 Wolfgang Behrenz; Ingeborg Hammann,
 both of Cologne, all of Germany
[21] Appl. No. 687,162
[22] Filed Dec. 1, 1967
[45] Patented Dec. 7, 1971
[73] Assignee Farbenfabriken Bayer Aktiengesellschaft
 Leverkusen, Germany
[32] Priority Dec. 13, 1966
[33] Germany
[31] F 50914

[54] O-METHYL-O-(2,2 DICHLORO-VINYL)
 PHOSPHORIC ACID ESTER MONOCHLORIDE
 AND METHOD OF PREPARATION
 5 Claims, No Drawings
[52] U.S. Cl....................................................... 260/957,
 260/239 EP, 260/247, 260/247.7 A, 260/293 R,
 260/294.7 A, 260/454, 260/940, 260/944,
 260/945, 260/948, 260/949, 260/950, 260/951,
 260/956, 260/969, 260/984, 260/986, 424/200,
 424/210, 424/211, 424/216, 424/217, 424/218,
 424/219
[51] Int. Cl....................................................... A01n 9/36,
 C07f 9/20, C07f 9/24

[50] Field of Search........................................... 260/957,
 986

[56] References Cited
 UNITED STATES PATENTS
 2,947,773 8/1960 Allen............................ 260/957 X
 3,082,239 3/1963 Muhlmann et al............. 260/986 X
 3,098,865 7/1963 Schimmelschmidt et al.  260/986 X
 3,364,109 1/1968 Haering........................ 260/957 X Primary Examiner—Charles B. Parker
Assistant Examiner—Richard L. Raymond
Attorney—Burgess, Dinklage and Sprung ABSTRACT: Reacting O,O-dimethyl-0-(2,2-dichloro-vinyl)-phosphoric acid ester with phosphorus pentachloride, or with phosphorus trichloride and chlorine, e.g. at about 40°–130° C., to form 0-methyl-0-(2,2-dichloro-vinyl)-phosphoric acid ester monochloride, and reacting said monochloride with ammonia or a primary or secondary amine, e.g. at a temperature up to about room temperature, in the presence of an acid binding agent to form the corresponding O-methyl-O-(2,2-dichloro-vinyl)-phosphoric acid ester amide, some of which are known, and which possess arthropodicidal properties.

O-METHYL-O-(2,2 DICHLORO-VINYL) PHOSPHORIC ACID ESTER MONOCHLORIDE AND METHOD OF PREPARATION

The present invention relates to and has for its objects the provision for particular new methods of producing 0-methyl-0-(2,2-dichloro-vinyl)-phosphoric acid ester monochloride and o-methyl-0-(2,2-dichloro-vinyl)-phosphoric acid ester amides, some of which are known, in two corresponding steps, using readily available starting materials whereby to attain outstanding yields, certain new 0-methyl-0-(2,2-dichloro-vinyl)-phosphoric acid ester amides which possess arthropodicidal properties, active compositions in the form of mixtures of such new compounds with solid and liquid dispersible carrier vehicles, and methods for using such new compounds in a new way especially for combating arthropods, with other and further objects of the invention becoming apparent from a study of the within specification and accompanying examples.

German Pat. Nos. 944,430 and 975,070 describe among other things the reaction of chloral with trialkylphosphites (A), which leads, in accordance with the following equation, to 0,0-dialkyl-0-(2,2-dichloro-vinyl)-phosphoric acid esters (IIA) [Perkov's reaction]:

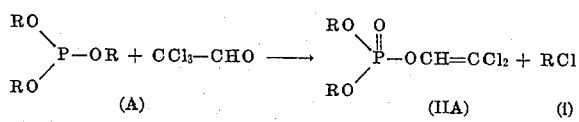

in which R is an alkyl radical.

U.S. Pat. No. 2,744,128 as well as British Pat. Nos. 783,697, 784,985 and 784,986 also relate to the preparation of dichloro-vinyl esters of phosphoric acid from trialkylphosphites and chloral.

German Pat. No. 968,486 describes a process for the preparation of 0-(2-chloro-ethyl)0-(2',2'-dichloro-vinyl)-phosphoric acid esters by reaction of ring-form phosphites with chloral.

The preparation of asymmetrical 2,2-dichloro-vinyl-phosphoric acid esters of the constitution (IIA) given above, in which the two radicals R are different, has been described in the literature (cf. for example U.S. Pat. Nos. 2,956,073 and 3,116,201).

The obtaining of 2,2-dichloro-vinyl-phosphoric acid ester amides (IA) by reaction of the appropriate 0,0'-dialkyl-phosphorus acid ester N,N-dialkyl amides (B) with chloral by the method of Perkov, according to the following equation, is known (cf. V. S. Abramov and N. A. Ilyina, "Doklady Akad. SSSR," Vol. 132, (1960), page 823, reported in "Chemical Abstracts" Vol. 54 (1960), column 22329g);

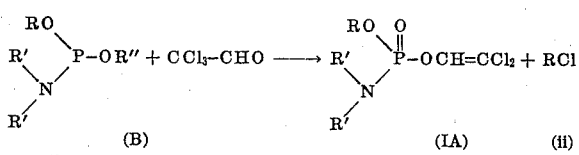

in which R, R' and and R" are the same or different radicals, preferably lower alkyl radicals.

If it is desired to prepare compounds of the last-mentioned type by the Perkov process, phosphorus acid diester amides (B) are required, as can be seen from the above-noted reaction equation.

In this case, however, the known process exhibits a series of disadvantages.

Specifically, the preparation of the phosphorus acid diester amides (B) required for the Perkov reaction is costly and difficult. As is known, the chlorine atoms in phosphorus trichloride cannot be replaced exactly stepwise by different radicals in such a manner that the asymmetrical phosphites desired are obtained in good yields. Instead, these compounds usually have to be obtained by isolating the 0-alkyl-phosphorus acid dichloride which is first obtained—which isolation is usually effected by distillation—in order to separate it from the by-products which are formed simultaneously. In the case of the preparation of phosphorus acid diester amides with different lower alkyl radicals, additional difficulties arise because the boiling points of main product and byproduct differ too little. The desired products are, rather, only accessible in a further mixture. Moreover, in the case of the preparation of mixed phosphorus acid ester amides with different alkyl radicals of higher molecular weight, considerable additional difficulties often arise. In this case, the boiling point of the 0-alkyl-phosphorus acid dichloride of higher molecular weight which is to be prepared in the first step may be so high that, at least when working on an industrial scale, a distillation purification of the aforesaid intermediate product is no longer possible or, on the other hand, a decomposition during distillation is to be feared. Poor yields and impure end products are the result.

It has now been found, in accordance with the present invention, that a versatile and smooth process may now be provided for the production in high yields and high purity of 0-methyl-0-(2,2-dichloro-vinyl)-phosphoric acid ester amides, some of which are known, having the formula

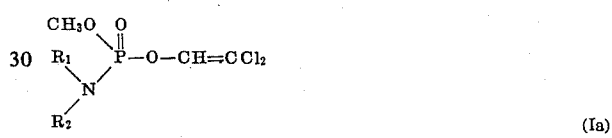

in which $R_1$ and $R_2$ each respectively is selected from the group consisting of hydrogen; alkyl having one to 12 carbon atoms; substituted alkyl having one to 12 carbon atoms which is substituted with a member selected from the group consisting of lower alkoxy, lower alkylmercapto, lower alkylamino, dilower alkylamino and one to three halo; alkenyl having two to 12 carbon atoms; cycloalkyl having five to eight ring carbon atoms; substituted cycloalkyl having five to eight ring carbon atoms and one to three lower alkyl substituents; phenyl lower alkyl; phenyl; and substituted phenyl which is substituted with one to three substituents selected from the group consisting of halo, nitro, cyano, thiocyano, lower alkoxy, lower alkylmercapto, lower alkyl sulfoxyl, lower alkyl sulfonyl, lower alkyl and mixtures of such substituents; with the proviso that $R_1$ and $R_2$ when taken together with the adjacent nitrogen atom form a heterocyclic ring system with one to three rings having three to 14 ring members and one to four hetero linking atoms selected from the group consisting of nitrogen, oxygen, sulfur and mixtures of such linking atoms; which comprises (a) reacting 0,0-dimethyl-0-(2,2-dichloro-vinyl)-phosphoric acid ester having the formula

with phosphorus pentachloride at a temperature substantially between about 40° to 130° C. to form the corresponding 0-methyl-0-(2,2-dichloro-vinyl)-phosphoric acid ester monochloride having the formula

and thereafter (b) reacting said monochloride with an amine reactant having the formula

in which $R_1$ and $R_2$ are the same as defined above, in the presence of an acid binding agent to form the corresponding 0-methyl-0-(2,2-dichloro-vinyl)-phosphoric acid ester amide.

It has been furthermore found in accordance with the present invention that particular new 0-methyl-0-(2,2-dichloro-vinyl)-phosphoric acid compounds having the formula

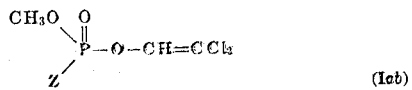
(Iab)

in which Z is selected from the group consisting of chloro and

in which $R_1$ is selected from the group consisting of $C_{2-12}$ alkenyl, $C_{5-8}$ cycloalkyl, phenyl and halophenyl, and $R_2$ is selected from the group consisting of hydrogen and $C_{1-12}$ alkyl, with the proviso that $R_1$ and $R_2$ when taken with the adjacent nitrogen atom form a heterocyclic ring system selected from the group consisting of ethylenimino, piperidyl and morpholyl, may also be provided, and that, of these, the particular new 0-methyl-0-(2,2-dichloro-vinyl)-phosphoric acid ester amides having the formula

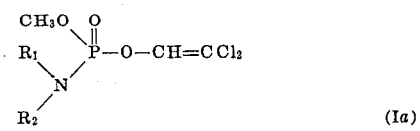
(Ia)

in which $R_1$ is selected from the group consisting of lower alkenyl, $C_{5-6}$ cycloalkyl, phenyl and chloro-substituted phenyl, and $R_2$ is selected from the group consisting of hydrogen and lower alkyl, with the proviso that $R_1$ and $R_2$ when taken with the adjacent nitrogen atom form a heterocyclic ring system selected from the group consisting of ethylenimino, piperidyl and morpholyl, exhibit strong arthropodicidal, especially insecticidal and acaricidal, properties.

Surprisingly, all of the new amide compounds of the present invention are distinguished from the active compounds of analogous constitution and the same type of activity hitherto known, by a much greater effectiveness, with considerably lower toxicity to warm-blooded animals and to plants. The instant new amides therefore represent a genuine enrichment of the art.

Advantageously, the instant new process has been found to operate smoothly and to be capable of giving high yields with a high degree of purity of the product.

The extremely smooth and uniform course of the reaction according to the present invention could not be foreseen, since it was to be expected that a mixture of chlorination products would be obtained. In particular the fact that the dichloro-vinyl group remains intact during the action of phosphorus pentachloride is very surprising, since the latter adds onto molecules even under mild reaction conditions (cf. for example "Chemisch Berichte", Vol. 63, page 1,158 (1930), Vol. 64, page 1,466 (1931), Vol. 66, page 278 (1933), Vol. 87, page 755 (1954), and Vol. 88, page 662 (1955) as well as U.S. Pat. No. 2,971,882). The possibility of the addition of halogen to the double bond in the 0,0-dimethyl-0-(2,2-dichloro-vinyl)-phosphoric acid ester (IIa) has also been indicated in the literature (see G. Schrader "Die Entwicklung neuer insektizider Phosphorsäure ester", 3rd Edition (1963), Verlag Chemie G.m.b.H., Weinheim, Bergstrasse, page 46, ibidem further literature) and it is equally surprising that this result does not occur either in carrying out the present invention.

Compared with the methods which have hitherto been suggested for the preparation of substances of the type under discussion, the process of the present invention exhibits a series of remarkable advantages. First, the use of the phosphorus acid diester amides (B) which are difficult to prepare is avoided; instead, the basic starting material is 0,0-dimethyl-0-(2,2-dichloro-vinyl)-phosphoric acid ester (IIa ) which is readily available even on an industrial scale, and from phosphorus pentachloride which is likewise obtainable commercially. Both steps of the process, in particular the chlorination step (a), proceed smoothly and can be readily carried out technologically. The 0methyl-0-(2,2-dichloro-vinyl)-phosphoric acid ester monochloride (IIb ) which is formed as novel and unobvious intermediate product, and which if desired can be isolated from the reaction mixture, can at present not be prepared in any other way, since the 1,1-dichloro-vinyl alcohol which would be required as starting material for the known type of reaction with phosphorus oxychloride does not exist.

Furthermore, by means of the process of the present invention many new, technologically valuable 2,2-dichloro-vinyl-phosphoric acid ester amides (Ia) can be obtained, which either could not be obtained or could only be obtained with difficulty by the methods described hitherto in the literature.

Besides its great breadth of application, the process of the present invention is also distinguished from earlier processes in that it can give better yields and purer products.

The course of the reactions of the process of the present invention is illustrated by the following equations:

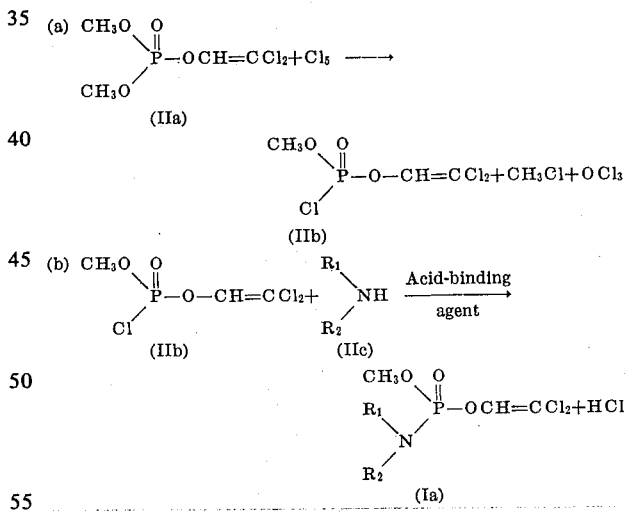

As can be seen from the above equations, the first reaction gives only slightly volatile by-products, namely methyl chloride and phosphorus oxychloride.

As examples of primary and secondary amines, i.e., in addition to ammonia, corresponding to formula (IIc) above, which may be used in accordance with the process of the present invention, there may be mentioned methyl, ethyl, n-propyl, isopropyl, n-butyl, isobutyl, sec.-butyl, n-amyl, isoamyl, tert.-amyl, 1,2,2-trimethylpropyl, pinacolyl, allyl, 2-methoxyethyl, 2-chloroethyl, 2,2,2-trichloroethyl, 2-ethylmercaptoethyl, 2-diethylaminoethyl, monomethylaminomethyl, cyclopentyl, cyclohexyl, methylcyclohexyl, dimethylcyclohexyl, trimethyl-cyclohexyl and benzyl amines as well as the corresponding symmetrical and asymmetrical (i.e. mixed substituent) diamines; aromatic amines, for example aniline, lower N-alkyl-anilines such as methyl- and ethyl-aniline; 2-, 3- and 4-chloro-, 2,4-and 2,5-dichloro-, and 2,4,5- and 2,4,6-trichloro-aniline; 2-chloro-4-methyl-, 3-chloro-4-methyl-, 3-methyl-4- chloro-, and 2-chloro-4-tert.-butyl-aniline; 2-, 3- and 4-nitroaniline; 2- and 3-chloro-4-nitroaniline, and 2,5- and 3,5-dichloro4-nitroaniline; 2- and 3-methyl-4-nitroaniline, and 3-nitro-4-methylaniline; 2- and 3-methoxy-4-nitroaniline; 3-nitro-4-chloro-, 3-nitro4,6-dichloro-, and 2-nitro-4chloro-aniline; 4-cyano-, 2- and 3-methyl-4-cyano-, 4-thiocyano-, and 2- and 3-methyl-4-thiocyano-aniline; 4-methyl-mercapto-, 4-methyl-sulphoxyl-, 4-methyl-sulphonyl-, 3-methyl-4-methyl-mercapto-, 3,5-dimethyl-4-methylmercapto-, 3-methyl-4-methyl-sulphoxyl-, and 3-methyl-4methyl-sulphonyl-aniline; and the like, and diphenylamine and its derivatives which are substituted in the nucleus in the manner stated above; and heterocyclic amines, for example ethylenimine, pyrrolidine, piperidine, morpholine, thiomorpholine, pyrrole, pyrazole, imidazole, 1,2,3- and 1,2,4-triazole, 1,2,3,4-and 1,2,3,5-tetrazole, indole, carbazole, indazole, benzimidazole, purine, phenoxazine; and the like.

The step (a) chlorination of the 0,0-dimethyl-0-(2,2-dichloro-vinyl)-phosphoric acid ester (IIa) takes place expediently in the absence of solvents, while the step (b) reaction of the intermediate, 0-methyl-0-(2,2-dichloro-vinyl)-phosphoric acid ester monochloride (IIb), with ammonia or the appropriate primary or secondary amine is carried out optionally, yet preferably, in the presence of inert organic solvents or diluents. As such, for either or both of steps (a) and (b), practically all inert organic solvents are suitable. Preferred solvents include hydrocarbons, such as especially aliphatic hydrocarbons, aromatic hydrocarbons and chlorinated aromatic hydrocarbons, and particulars, lower aliphatic (lower alkyl) hydrocarbons, benzene hydrocarbons and chlorobenzene hydrocarbons, e.g. benzine, benzene, toluene, xylene or chlorobenzene; ethers, especially aliphatic and cycloaliphatic ethers, and particularly lower aliphatic (lower alkyl) and cycloaliphatic ethers, e.g. diethyl, dibutyl, etc. ether, dioxan, tetrahydrofuran, etc., as well as low-boiling aliphatic ketones and nitriles, especially lower aliphatic ketones and nitriles, and particularly lower alkyl ketones and lower alkanoic acid nitriles, e.g. acetone, methylethyl, methylisopropyl, methylisobutyl ketone, etc., acetonitrile, propionitrile, etc.; and the like.

Moreover, the second step (b) is carried out preferably in the presence of acid-binding agents. Particularly suitable are tertiary organic amine bases, such as tertiary aliphatic, aromatic or heterocyclic amines, especially tertiary lower aliphatic (tri-lower alkyl), dilower aliphatic-phenyl (dilower alkyl-phenyl), diphenyl-lower aliphatic (diphenyl-lower alkyl) amines, and pyridine, e.g. triethylamine, diethylaniline, pyridine, etc., as well as alkali metal carbonates, cyanides and alcoholates (particularly alkylolates or alkanolates, including lower alkylolates or alkanolates, etc.), such as potassium, sodium, etc., carbonate, cyanide, methylate, ethylate, etc. Finally, it is also possible to use as acid-binding agent or acid accepter a 100 percent or more excess of the respective primary or secondary amine to be reacted in the second step of the instant process.

Both the first and the second steps of the process of the present invention can be carried out within fairly wide temperature ranges. The chlorination step (a) takes place, in general, at substantially between about 40° to 130° C., preferably 70° to 120° C., while in the second step (b) the reaction is generally carried out at low temperatures, i.e. up to about room temperature (substantially between about −10° to +20°C., preferably −5° to +10°C.).

As can be seen from the equations stated above, for each mol of 0,0-dimethyl-(2,2-dichloro-vinyl)-phosphoric acid ester (IIa) about 1 mol of phosphorus pentachloride is used and, in addition, for each mol of 0-methyl-0-(2,2-dichloro-vinyl)-phosphoric acid ester monochloride (IIb) about 1 mol of ammonia or primary or secondary amine and 1 mol of acid-binding agent are used.

The chlorination step (a) takes place expediently in such a manner that the calculated amount of phosphorus pentachloride is introduced portionwise, with stirring, into the 0,0-dimethyl-0-(2,2-dichloro-vinyl)-phosphoric acid ester (IIa) and the reaction temperature increases gradually during the course of the addition until the above-mentioned maximum value is reached, while methyl chloride is evolved. Then, in order to complete the reaction, the reaction mixture is expediently heated for a further one-half to 3 hours and the phosphorus oxy-chloride which is formed as by-product is then distilled off under reduced pressure. The 0-methyl-0-(2,2-dichloro-vinyl)-phosphoric acid ester monochloride (IIb) which remains behind is pure enough for the ensuing reaction. If desired, it may, however, be distilled under reduced pressure without appreciable losses of yield, and even be recovered per se.

According to a special form of carrying out the chlorination step (a) of the instant process, a mixture of the 0,0-dimethyl-0-(2,2-dichloro-vinyl)-phosphoric acid ester (IIa) and approximately the equimolar amount of phosphorus trichloride is prepared and into this mixture there is introduced approximately half the calculated amount of molecular chlorine, i.e. gaseous chlorine.

The reaction of the 0-methyl-0-(2,2-dichloro-vinyl)-phosphoric acid ester monochloride (IIb) in amination step (b) takes place expediently in such a manner that a solution of the latter in a suitable solvent or diluent, e.g. of the foregoing type, is added dropwise, with stirring, to a mixture of the primary or secondary amine and the acid-binding agent (the reverse sequence may, however, also be chosen, especially where the amine reactant of formula (IIc) is gaseous ammonia or even liquid ammonia), and the reaction mixture is then maintained for a short time at room temperature.

The working up of the product may be effected in known manner by filtering off the precipitated salt, neutralizing the filtrate, drying it and evaporating the solvent, preferably under reduced pressure.

The 2,2-dichloro-vinyl-phosphoric acid ester amides (Ia) obtainable by the instant process remain behind in most cases in the form of colorless to slightly yellow colored oils, some of which can be distilled under greatly reduced pressure without decomposition and, in addition, can be unambiguously characterized on the basis of their refractive index, the thin layer chromatogram and the values for the elementary analysis. Sometimes, however, the instant amides are also obtained as crystalline substances with sharp melting point.

As already mentioned above, in accordance with the present invention all of the amide compounds of formula (Ia ) (most of which are new and unobvious compounds) have been found effective as insecticides or acaricides, i.e. arthropodicides; they possess a rapidly-commencing and long-lasting pesticidal effectiveness, with comparatively low toxicity to warm-blooded animals and comparatively low phytotoxicity. These 2,2-dichloro-vinyl-phosphoric acid ester amides (Ia ) can be used with success for the control of noxious sucking and biting insects, Diptera as well as mites, particularly in plant protection and the protection of stored goods, but also in the hygiene field.

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the currant gall aphid (*Cryptomyzus korschelti*), the mealy apple aphid (*Sappaphis mali*), the mealy plum aphid (*Hyalopterus arundinis*) and the cherry black-fly (*Myzus cerasi*); scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedium*), the bed bug (*Cimex lectularius*), the assassin bug (*Rhodnius prolixus*) and Chagas' bug (*Triatoma infestans*) and, cicadas, such as *Euscelis bilobatus* and *Nephotettix bipunctatus*; and the like.

In the case of the biting insects contemplated herein, there should especially be mentioned butterfly caterpillars (Lepidoptera) such as the diamond-back moth (*Plutella maculipennis*), the gipsy moth (*Lymantria diapar*), the brown-tail moth (*Euproctis chrysorrhoea*) and tent caterpillar (*Malacosoma neustria*); the cabbage moth (*Manestra brassicae*) and the cutworm (*Agrotis segetum*), *the large white butterfly* (*Pieris brassicae*), the small winter moth (*Cheimatobia brumata*), the green oak tortrix moth (*Tortrix viridana*); the fall army worm (*Laphygma frugiperda*) rugiperda) and cotton worm (*Prodenia litura*), the ermine moth (*Hyponomeuta padella*), the Mediterranean flour moth (*Ephestia Kühniella*) and greater wax moth (*Galleria mellonella*); and the like. Also to be classed with the biting insects in this regard are beetles (Coleoptera), for example the granary weevil (*Sitophilus granarius = Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*); the rasberry beetle (*Byturus tomentosus*), the bean weevil (*Bruchidus = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drug-store beetle (*Stegobium paniceum*), the yellow mealworm (*Tenebrio molitor*) and the saw-toothed grain beetle (*Oryzaephilus surinamensis*), and also species living in the soil, for example wireworms (*Agriotes* species) and larvae of the cockchafer (*Melolontha melolontha*); cockroaches; such as the German cockroach (*Blatella germanica*), American cockroach (*Periplaneta americana*), Madeira cockroach (*Laucophaea* or *Rhyparobia madeirae*), Oriental cockroach (*Blatta orientalis*), giant cockroach (*Blaberus giganteus*) and black giant cockroach (*Blaberus fuscus*) as well as *Henschoutedenia flexivitta*; further, Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and blue-bottle fly (*Calliphora erythrocephala*) as well as the stable fly (*Stomoxys calcitrans*); as well as gnats, for example mosquitoes such as the yellow fever mosquito (*Aedes aegypti*), the northern house mosquito (*Culex pipiens*) and the malaria mosquito (*Anopheles stephensi*).

With the mites (*Acari*) there are classed, in particular, the spider mites (*Tetranychidae*) such as the two-spotted spider mite (*Tetranychus telarius = Tetranychus althaeae* or *Tetranychus urticae*) and the European red mite (*Paratetranychus pilosus = Panonychus ulmi*), blister mites, for example, the current blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with diluents or extenders, i.e. dispersible carrier vehicles, such as solutions, emulsions, suspensions, emulsifiable concentrates, spray powders, pastes, soluble powders, dusting agents, granulates, etc. These are prepared in known manner, for instance by extending the active compounds with dispersible liquid diluent carriers and/or dispersible solid carriers optionally with the use of carrier vehicle assistants, e.g. surface-active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (e.g. benzene, toluene, xylene, etc.), halogenated, specially chlorinated, aromatic hydrocarbons (e.g. chlorobenzenes, etc.), paraffins (e.g. petroleum fractions), (e.g. aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and water, as well as dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as carrier vehicle assistants, e.g. surface-active agents, for this purpose; emulsifying agents, such as nonionic and anionic emulsifying agents (e.g. polyethylene oxide esters of fatty acids, polyethylene oxide ethers of fatty alcohols, alkyl sulfonates, aryl sulfonates, etc., and especially alkyl arylpolyglycol esters, magnesium stearate, sodium oleate, etc.); and dispersing agents, such as lignin, sulfite waste liquors, methyl cellulose, etc.

Such active compounds may be employed alone or in the form of mixtures with one another and/or with such solid or liquid dispersible carrier vehicles and/or with other known compatible active agents, especially plant protection agents, such as other acaricides, insecticides, fungicidds, herbicides, bactericides, etc., if desired, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95 percent, and preferably 0.5–90 percent by weight, of the mixture, whereas carrier composition mixtures suitable for direct application or field application generally contemplate those in which the active compound is present in an amount substantially between about 0.00001–20 percent, preferably 0.01–5 percent, by weight of the mixture. Thus, the present invention contemplates overall compositions which comprise mixtures of a dispersible carrier vehicle such as (1) a dispersible carrier solid, or (2) a dispersible carrier liquid preferably including a carrier vehicle assistant, e.g. surface-active agent, such as an emulsifying agent and/or a dispersing agent, and an amount of the active compound which is effective for the purpose in question and which is generally between about 0.00001–95 percent, and preferably 0.01–95 percent by weight of the mixture.

In particular, the present invention contemplates methods of selectively controlling or combating pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative amount, i.e. an anthropodicidally, especially insecticidally or acaricidally, effect amount of the particular active compound of the invention alone or together with a carrier vehicle as noted above. The instant formulations or compositions are applied in the usual manner, for instance by spraying, atomizing, vaporizing, gasifying fumigating, scattering, dusting, watering, sprinkling, pouring and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority as well as the outstanding activity of the instant compounds when used against a multiplicity of pests and animal parasites is illustrated without limitation by the following examples.

EXAMPLE 1

Phaedon larvae test

| | |
|---|---|
| Solvent | 3 parts by weight acetone |
| Emulsifier | 1 part by weight alkylaryl polyglycol ether |

To produce a suitable preparation of the particular active compound, 1 part by weight of such active compound is mixed with the stated amount of solvent containing the stated amount of emulsifier, and the concentrate obtained is diluted with water to the desired final concentration.

Cabbage leaves (*Brassica oleracea*) are sprayed with this preparation of the given active compound until dripping wet and then infested with mustard beetle larvae (*Phaedon cochleariae*).

After the period of time stated in the following table, the degree of destruction of the pests is determined and expressed as a percentage: 100 percent means that all, and 0 percent means that none, of the beetle larvae are killed.

The particular active compounds tested, their concentrations, the evaluation time and the experimental results obtained can be seen from the following table 1:

EXAMPLE 2

Drosophila Test

| | |
|---|---|
| Solvent | 3 parts by weight acetone |
| Emulsifier | 1 part by weight alkylaryl polyglycol ether |

To produce a suitable preparation of the particular active compound, 1 part by weight of such active compound is mixed with the stated amount of solvent containing the stated amount of emulsifier, and the resulting concentrate is diluted with water to the desired final concentration.

1 cc. of the preparation of the given active compound is applied with a pipette to a filter paper disc of 7 cm. diameter. The wet disc is placed in a glass vessel containing 50 vinegar flies (*Drosophila melaogaster*) and covered with a glass plate.

After the specified period of time, the destruction is determined as a percentage: 100 percent means that all the flies are killed; 0 percent means that none of the flies are killed.

The particular active compounds tested, their contractions, the evaluation time and the degree of destruction obtained can be seen from the following table 2:

TABLE 1

| Active compound (constitution) | Concentration of active compound in percent | Degree of destruction in percent after 3 days |
|---|---|---|
| (IIIa₁) $(CH_3O)(({CH_3})_2CH-NH)P(=O)-O-CH=CCl_2$ | 0.1<br>0.01<br>0.001 | 100<br>100<br>90 |
| (IV₁) $(CH_3O)(CH_2=CH-CH_2-NH)P(=O)-O-CH=CCl_2$ | 0.1<br>0.01 | 100<br>100 |
| (V₁) $(CH_3O)(\text{aziridinyl})P(=O)-O-CH=CCl_2$ | 0.1<br>0.01<br>0.001 | 100<br>100<br>60 |
| (VIa₁) $(CH_3O)(CH_3-NH)P(=O)-OCH=CCl_2$ | 0.1<br>0.01 | 100<br>100 |
| (VII₁) $(CH_3O)(C_6H_{11}-NH)P(=O)-OCH=CCl_2$ | 0.1<br>0.01 | 100<br>100 |

TABLE 2

| Active compound (constitution) | Concentration of active compound in percent | Degree of destruction in percent after 24 hours |
|---|---|---|
| (IIIa₂) $(CH_3O)((CH_3)_2CH-NH)P(=O)-O-CH=CCl_2$ | 0.1<br>0.01<br>0.001<br>0.0001 | 100<br>100<br>100<br>90 |
| (IV₂) $(CH_3O)(CH_2=CH-CH_2-NH)P(=O)-O-CH=CCl_2$ | 0.1<br>0.01<br>0.001 | 100<br>100<br>100 |
| (VIIIa₁) $(CH_3O)((C_2H_5)_2N)P(=O)-O-CH=CCl_2$ | 0.1<br>0.01<br>0.001 | 100<br>100<br>100 |
| (IX₁) $(CH_3O)(C_6H_{11}-N)P(=O)-O-CH=CCl_2$ | 0.1<br>0.01 | 100<br>100 |

TABLE 2

| Active compound (constitution) | Concentration of active compound in percent | Degree of destruction in percent after 24 hours |
|---|---|---|
| ($X_1$) — $CH_3O$, $O$, $P$—$O$—$CH$=$CCl_2$, with ring containing O and N | 0.1<br>0.01<br>0.001 | 100<br>100<br>100 |
| ($V_2$) — $CH_3O$, $O$, $CH_2$, $P$—$O$—$CH$=$CCl_2$, $N$, $CH_2$ | 0.1<br>0.01<br>0.001 | 100<br>100<br>100 |
| ($VIa_2$) — $CH_3O$, $O$, $P$—$O$—$CH$=$CCl_2$, $CH_3$—$NH$ | 0.1<br>0.01<br>0.001 | 100<br>100<br>100 |
| ($VII_2$) — $CH_3O$, $O$, $P$—$O$—$CH$=$CCl_2$, H ring —$NH$ | 0.1<br>0.01 | 100<br>100 |

EXAMPLE 3

Myzus Test (contact action)

Solvent    3 parts by weight acetone
Emulsifier    1 part by weight alkylaryl polyglycol ether.

To produce a suitable preparation of the particular active compound 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time, the degree of destruction is determined as a percentage: 100 percent means that all the aphids are killed whereas 0 percent means that none of the aphids are killed.

The particular active compounds tested, their concentrations, the evaluation time and the results obtained can be seen from the following table 3:

TABLE 3

| Active compound (constitution) | Concentration of active compound in percent | Degree of destruction in percent after 24 hours |
|---|---|---|
| ($IIIa_3$) — $CH_3O$, $O$, $P$—$O$—$CH$=$CCl_2$, $(CH_3)_2CH$—$NH$ | 0.1<br>0.01 | 100<br>95 |
| ($IV_3$) — $CH_3O$, $O$, $P$—$O$—$CH$=$CCl_2$, $CH_2$=$CH$—$CH_2$—$NH$ | 0.1<br>0.01 | 100<br>95 |
| ($V_3$) — $CH_3O$, $O$, $CH_2$, $P$—$O$—$CH$=$CCl_2$, $N$, $CH_2$ | 0.1<br>0.01 | 100<br>99 |
| ($VIa_3$) — $CH_3O$, $O$, $P$—$O$—$CH$=$CCl_2$, $CH_3$—$NH$ | 0.1<br>0.01 | 100<br>99 |

EXAMPLE 4

Tetranychus Test

Solvent    3 parts by weight acetone
Emulsifier    1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100 percent means that all the spider mites are killed whereas 0 percent means that none of the spider mites are killed.

The particular active compounds tested, their concentrations, the evaluation time and the results obtained can be seen from the following table 4:

TABLE 4

| Active compound (constitution) | Concentration of active compound in percent | Degree of destruction in percent after 48 hours |
|---|---|---|
| (IIIa$_4$) $\quad$ $CH_3O$ $\quad$ $O$ $\quad\quad\quad\quad\quad\quad\quad$ \P—O—CH=CCl$_2$ $\quad$ $(CH_3)_2CH—NH$ | 0.1 | 100 |
| (IVa$_4$) $\quad$ $CH_3O$ $\quad$ $O$ $\quad\quad\quad\quad\quad\quad\quad$ \P—O—CH=CCl$_2$ $\quad$ $CH_2=CH—CH_2—NH$ | 0.1 | 100 |
| (VIa$_4$) $\quad$ $CH_3O$ $\quad$ $O$ $\quad\quad\quad\quad\quad\quad\quad$ \P—O—CH=CCl$_2$ $\quad$ $CH_3—NH$ | 0.1<br>0.01 | 100<br>80 |

EXAMPLE 5

Rhopalosiphum Test (systemic action)

Solvent  3 parts by weight acetone
Emulsifier 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Oat plants (*Avena sativa*) which have been strongly infested with oat aphids (*Rhopalosiphum padi*) are watered with the preparation of the given active compound so that the preparation penetrates into the soil without wetting the leaves of the oat plants. The active compound is taken up by the oat plants from the soil and thus reaches the infested leaves.

After the specified period of time, the degree of destruction is determined as a percentage: 100 percent means that all the aphids are killed whereas 0 percent means that none of the aphids are killed.

The particular active compounds tested, their concentrations, the evaluation time and the results obtained can be seen from the following table 5:

EXAMPLE 6

LT$_{100}$ Test for Diptera
Test insects: House flies (*Musca domestica*)
Solvent: Acetone.

2 parts by weight of the particular active compound are dissolved in 1000 parts by volume of solvent. The solution so obtained is diluted with further solvent to the desired final lower concentration.

2.5 ml. of the solution of the given active compound are pipetted into a Petri dish. On the bottom of the Petri dish there is a filter paper with a diameter of about 9.5 cm. The petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100 percent knockdown effect is determined.

The test insects, the particular active compounds tested, their concentrations and the period of time at which there is a 100 percent knockdown effect can be seen from the following table 6:

TABLE 5

| Active compound (constitution) | Concentration of active compound in percent | Degree of destruction in percent after 4 days |
|---|---|---|
| (IIIa$_5$) $\quad$ $CH_3O$ $\quad O$ \P—O—CH=CCl$_2$ $\quad$ $(CH_3)_2CH—NH$ | 0.1<br>0.01 | 100<br>100 |
| (IV$_5$) $\quad$ $CH_3O$ $\quad O$ \P—O—CH=CCl$_2$ $\quad$ $CH_2=CH—CH_2—NH$ | 0.1<br>0.01 | 100<br>95 |
| (VIIIa$_2$) $\quad$ $CH_3O$ $\quad O$ \P—O—CH=CCl$_2$ $\quad$ $(C_2H_5)_2N$ | 0.1 | 100 |
| (IX$_2$) $\quad$ $CH_3O$ $\quad O$ \P—O—CH=CCl$_2$ $\quad$ cyclohexyl-NH | 0.1 | 100 |
| (X$_2$) $\quad$ $CH_3O$ $\quad O$ \P—O—CH=CCl$_2$ $\quad$ morpholino-N | 0.1 | 100 |
| (V$_4$) $\quad$ $CH_3O$ $\quad O$ \P—O—CH=CCl$_2$ $\quad$ piperidino-N | 0.1 | 100 |
| (VIa$_5$) $\quad$ $CH_3O$ $\quad O$ \P—O—CH=CCl$_2$ $\quad$ $CH_3—NH$ | 0.1<br>0.01 | 100<br>100 |

TABLE 6

| Active compound (constitution) | | Concentration of active compound in percent | LT₁₀₀ in minutes (') or hours (ʰ) | |
|---|---|---|---|---|
| (IIIa₆) | $CH_3O\underset{(CH_3)_2CH-NH}{\overset{O}{\diagdown\overset{\|}{P}-O-CH=CCl_2}}$ | 0.2<br>0.02<br>0.0002<br>0.0002 | 15'<br>40'<br>105'<br>8ʰ | =50% |
| (VIIIa₃) | $CH_3O\underset{(C_2H_5)_2N}{\overset{O}{\diagdown\overset{\|}{P}-O-CH=CCl_2}}$ | 0.2<br>0.02<br>0.002 | 55'<br>190'<br>8ʰ | =50% |
| (IX₃) | $CH_3O\underset{\langle H\ N}{\overset{O}{\diagdown\overset{\|}{P}-O-CH=CCl_2}}$ | 0.02<br>0.02<br>0.012 | 25'<br>80'<br>8ʰ | =50% |
| (X₃) | $CH_3O\underset{O\ \ N}{\overset{O}{\diagdown\overset{\|}{P}-O-CH=CCl_2}}$ | 0.2<br>0.02<br>0.002<br>0.0002 | 15'<br>25'<br>130'<br>8ʰ | =70% |
| (V₃) | $CH_3O\underset{CH_2\diagdown N\diagup CH_2}{\overset{O}{\diagdown\overset{\|}{P}-O-CH=CCl_2}}$ | 0.2<br>0.02<br>0.002<br>0.0002 | 10'<br>15'<br>60'<br>240' | |
| (IV₆) | $CH_3O\underset{CH_2=CH-CH_2}{\overset{O}{\diagdown\overset{\|}{P}-O-CH=CCl_2\diagup NH}}$ | 0.2<br>0.02<br>0.0002<br>0.0002 | 20'<br>35'<br>220'<br>8ʰ | =60% |

EXAMPLE 7

LT₁₀₀ Test for Diptera
Test insects: Yellow fever mosquitoes (*Aedes aegypti*)
Solvent: Acetone.

Two parts by weight of the particular active compound are dissolved in 1000 parts by volume of solvent. The solution so obtained is diluted with further solvent to the desired final lower concentration.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is continuously observed. The time which is necessary for a 100 percent knockdown effect is determined.

The test insects, the particular active compounds tested, their concentrations and the period of time at which there is a 100 percent knockdown effect can be seen from the following table 7:

EXAMPLE 8

LD₁₀₀ Test
Test insects: Oriental cockroaches (*Blatta orientalis*)
Solvent: Acetone.

Two parts by weight of the particular active compound are dissolved in 1000 parts by volume of the solvent. The solution so obtained is diluted with further solvent to the desired final concentration.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed after 1 and 3 days from the commencement of the experiments. The knockdown effect is determined as a percentage, and this is stated as LD₁₀₀.

The particular active compounds tested, their concentrations and the results obtained can be seen from the following table 8:

TABLE 7

| Active compound (constitution) | | Concentration of active compound in percent | LT₁₀₀ in minutes | |
|---|---|---|---|---|
| (IIIa₇) | $CH_3O\underset{(CH_3)_2CH-NH}{\overset{O}{\diagdown\overset{\|}{P}-O-CH=CCl_2}}$ | 0.2<br>0.02<br>0.002 | 60<br>60<br>120 | |
| (VIIIa₄) | $CH_3O\underset{(C_2H_5)_2N}{\overset{O}{\diagdown\overset{\|}{P}-O-CH=CCl_2}}$ | 0.2<br>0.02<br>0.002 | 60<br>60<br>180 | =90% |
| (IX₄) | $CH_3O\underset{\langle H\ N}{\overset{O}{\diagdown\overset{\|}{P}-O-CH=CCl_2}}$ | 0.2<br>0.02<br>0.002 | 60<br>80<br>180 | =80% |

TABLE 7

| Active compound (constitution) | Concentration of active compound in percent | LT$_{100}$ in minutes | |
|---|---|---|---|
| (X$_4$) $\quad$ CH$_3$O, O<br>$\quad\quad\quad$ P—O—CH=CCl$_2$<br>$\quad\quad$ (morpholine ring with O, N) | 0.2<br>0.02<br>0.002 | 60<br>60<br>180 | |
| (V$_6$) $\quad$ CH$_3$O, O<br>$\quad\quad$ CH$_2$ P—O—CH=CCl$_2$<br>$\quad\quad\quad$ N<br>$\quad\quad$ CH$_2$ | 0.2<br>0.02<br>0.002<br>0.0002<br>0.00002 | 60<br>60<br>60<br>180<br>180 | =80% |
| (IV$_7$) $\quad$ CH$_3$O, O<br>$\quad\quad\quad$ P—O—CH=CCl$_2$<br>$\quad$ CH$_2$=CH—CH$_2$—NH | 0.2<br>0.02<br>0.002<br>0.0002 | 60<br>60<br>180<br>180 | =70% |

TABLE 8

| Active compound (constitution) | Concentration of active compound in percent | Knock-down effect (LD$_{100}$) in percent after 72 hrs. |
|---|---|---|
| (IIIa$_8$) $\quad$ CH$_3$O, O<br>$\quad\quad\quad$ P—O—CH=CCl$_2$<br>$\quad$ (CH$_3$)$_2$CH—NH | 0.2<br>0.02<br>0.002 | 100<br>100<br>60 |
| (VIIIa$_5$) $\quad$ CH$_3$O, O<br>$\quad\quad\quad$ P—O—CH=CCl$_2$<br>$\quad$ (C$_2$H$_5$)$_2$N | 0.2<br>0.02 | 100<br>60 |
| (IX$_5$) $\quad$ CH$_3$O, O<br>$\quad\quad\quad$ P—O—CH=CCl$_2$<br>$\quad$ (piperidine ring with H, N) | 0.2 | 100 |
| (X$_5$) $\quad$ CH$_3$O, O<br>$\quad\quad\quad$ P—O—CH=CCl$_2$<br>$\quad$ (morpholine ring with O, N) | 0.2 | 100 |
| (V$_7$) $\quad$ CH$_3$O, O<br>$\quad\quad$ CH$_2$ P—OCH=CCl$_2$<br>$\quad\quad\quad$ N<br>$\quad\quad$ CH$_2$ | 0.2<br>0.02<br>0.002 | 100<br>100<br>30 |
| (IV$_8$) $\quad$ CH$_3$O, O<br>$\quad\quad\quad$ P—O—CH=CCl$_2$<br>$\quad$ CH$_2$=CH—CH$_2$—NH | 0.2<br>0.02 | 100<br>60 |

EXAMPLE 9

LD$_{100}$ test
Test insects: Granary weevils (*Sitophilus granarius*)
Solvent: Acetone.

Two parts by weight of the particular active compound are dissolved in 1000 parts by volume of the solvent. The solution so obtained is diluted with further solvent to the desired final concentration.

2.5 ml. of the solution of the given active compound are pipetted into a Petri dish. On the bottom of the Petri dish there is a filter paper with a diameter of about 9.5 cm. The Petri dish remains uncovered until the solvent has completely evaporated. The amount of active compound per square meter of filter paper varies with the concentration of the solution of active compound used. About 25 test insects are then placed in the Petri dish and it is covered with a glass lid.

The condition of the test insects is observed after 1 and 3 days from the commencement of the experiments. The knockdown effect is determined as a percentage (LD$_{100}$).

The particular active compounds tested, their concentrations, the test insects and the results obtained can be seen from the following table 9:

EXAMPLE 10

Mosquito larvae test

| Test insects: | Yellow fever mosquito larvae (*Aedes aegypti*) |
|---|---|
| Solvent: | 99 parts by weight acetone |
| Emulsifier: | 1 part by weight benzylhydroxydiphenyl polyglycol ether. |

To produce a suitable preparation of the particular active compound, two parts by weight of such active compound are dissolved in 1000 parts by volume of the solvent containing the amount of emulsifier stated above. The solution thus obtained is diluted with water to the desired final lower concentrations.

The aqueous preparations of the given active compounds are placed in glass vessels and about 25 mosquito larvae are then placed in each glass vessel.

After 24 hours, the degree of destruction is determined as a percentage. 100 percent means that all the larvae are killed. 0 percent means that no larvae at all are killed.

The particular active compounds tested, their concentrations, the test insects and the results obtained can be seen from the following table 10:

TABLE 9

| Active compound (constitution) | | Concentration of active compound in percent | Knock-down effect (LD$_{100}$) in percent after 72 hrs. |
|---|---|---|---|
| (IIIa$_9$) | CH$_3$O, (CH$_3$)$_2$CHNH \ P(=O) — O—CH=CCl$_2$ | 0.2<br>0.02 | 100<br>100 |
| (VIIIa$_6$) | CH$_3$O, (C$_2$H$_5$)$_2$N \ P(=O) — O—CH=CCl$_2$ | 0.2<br>0.02 | 100<br>30 |
| (X$_6$) | CH$_3$O, morpholino-N \ P(=O) — O—CH=CCl$_2$ | 0.2<br>0.02 | 100<br>90 |
| (V$_8$) | CH$_3$O, aziridinyl-N \ P(=O) — O—CH=CCl$_2$ | 0.2<br>0.02 | 100<br>100 |
| (IV$_9$) | CH$_3$O, CH$_2$=CH—CH$_2$—NH \ P(=O) — O—CH=CCl$_2$ | 0.2<br>0.02<br>0.002 | 100<br>100<br>50 |

TABLE 10

| Active compound (constitution) | | Concentration of active compound in percent | Degree of destruction in percent |
|---|---|---|---|
| (IIIa$_{10}$) | CH$_3$O, (CH$_3$)$_2$CH—NH \ P(=O) — O—CH=CCl$_2$ | 0.001<br>0.0001 | 100<br>80 |
| (IX$_6$) | CH$_3$O, piperidino-N \ P(=O) — O—CH=CCl$_2$ | 0.001 | 100 |
| (X$_7$) | CH$_3$O, morpholino-N \ P(=O) — O—CH=CCl$_2$ | 0.001<br>0.0001 | 100<br>30 |
| (V$_9$) | CH$_3$O, aziridinyl-N \ P(=O) — O—CH=CCl$_2$ | 0.001<br>0.0001 | 100<br>100 |
| (IV$_{10}$) | CH$_3$O, CH$_2$=CH—CH$_2$NH \ P(=O) — O—CH=CCl$_2$ | 0.001<br>0.0001 | 100<br>100 |

The following further examples illustrate without limitation the production process of the present invention:

EXAMPLE 11 a. 0-methyl-0-(2,2-dichlorovinyl)-phosphoric acid ester chloride

(IIb)

To 221 g. 0,0-dimethyl-0-(2,2-dichlorovinyl) phosphoric acid ester (IIa) are added 209 g. phosphorus pentachloride, portionwise at such a rate that the preceding portion has in each case largely dissolved or reacted. This is readily discernible by the reduction of solid phosphorus pentachloride in the reaction mixture. During the said addition the temperature of the mixture is increased from 70° C. initially to 110° to 120° C. and, after completion of the addition, the mixture is further stirred for 1 hour at 120° C. The phosphorus oxychloride formed as byproduct is distilled off under reduced pressure. The 0-methyl-0-(2,2-dichlorovinyl)-phosphoric acid ester monochloride (IIb) comes over at 84° to 90° C./1 mm. Hg. and possesses the refractive index n$_D^{20}$1.4730. The yield is 170 g. (75 percent of the theory).

ANALYSIS

Calculated for C$_3$H$_4$O$_3$Cl$_3$P (molecular weight 225.41)

| Found | Cl | 47.19% | P | 13.74% |
|---|---|---|---|---|
|  | Cl | 48.57% | P | 13.86% |

(b)

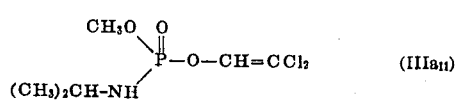

(IIIa$_{11}$)

To a mixture of 64 g. isopropylamine and 101 g. triethylamine in 1 liter benzene, there is added dropwise at 10° C. a solution of 225.6 g. 0-methyl-0-(2,2-dichlorovinyl)-phosphoric acid ester chloride (IIb). After completion of the addition, the mixture is further stirred for 1 hour at room temperature. The precipitated salts are then filtered off with suction and the filtrate is washed until there is a neutral reaction. The organic layer is then dried over sodium sulfate and the solvent is distilled off. The residue comes over at a pressure of 0.3 mm. Hg. at 114° C. After distillation, the 0-methyl-N-isopropyl-0-(2,2-dichlorovinyl)-phosphoric acid ester amide (III) possesses a refractive index of $n_D^{20}=1.4676$. The yield is 147 g. (59 percent of the theory).

ANALYSIS

Calculated for $C_6H_{12}O_3Cl_2NP$ (molecular weight 248.06)

|  | Cl | N | P |
|---|---|---|---|
|  | 28.59% | 5.65% | 12.48% |
| Found | 28.86% | 5.83% | 12.51% |

EXAMPLE 12

According to the methods described above under example 11(b), there can also be obtained the 2,2-dichlorovinyl-phosphoric acid ester amides of the general constitution

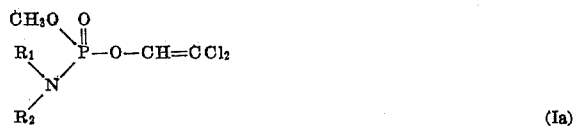

(Ia)

which are listed in the following table. The yields stated are not striking. With appropriate conduct of experiment, they can, almost without exception, be increased to about 70 percent:

|  | $R_1$ | $R_2$ | B.P. or M.P. (°C.) | Refractive index [$n_D^{20}$] | Yield (percent of the theory) |
|---|---|---|---|---|---|
| (VIa₆) | CH₃— | H | B.P.=102 [1] | [2] 1.4713 | 54.5 |
| (IV₁₁) | CH₂=CH—CH₂— | H | B.P.=145 [3] | 1.4845 | 43.5 |
| (VII₃) | ⟨H⟩— | H | M.P.=64 | --------- | 51.5 |
| (XI₁) | Cl—⟨ ⟩— | H | --------- | 1.5546 | 68.0 |
| (VIIIa₇) | C₂H₅— | C₂H₅— | B.P.=95 [4] | 1.4659 | 46.0 |
| (XIIa₁) | nC₃H₇— | nC₃H₇— | B.P.=103-105 | 1.4638 | 34.5 |
| (XIIIa₁) | nC₄H₉— | nC₄H₉— | --------- | 1.4615 | 76.0 |
| (XIV₁) | ⟨ ⟩— | CH₃— | --------- | 1.5472 | 90.0 |
| (V₁₀) | CH₂—CH₂ (ring) | | B.P.=96 [1] | 1.4831 | 50.0 |
| (IX₇) | CH₂ CH₂ / CH₂—CH₂—CH₂ | | B.P.=110-115 | 1.4881 | 45.0 |
| (X₈) | CH₂ CH₂ / CH₂—O—CH₂ | | B.P.=115 [1] | 1.4878 | 33.0 |

[1] 0.01 mm.
[2] $n^{28}$.
[3] 0.1 mm.
[4] 0.05 mm.

Advantageously, in accordance with the present invention, in the foregoing formulas:

$R_1$ and $R_2$ each respectively represents (same or different) hydrogen;

straight and branched chain alkyl having one to 12 carbon atoms such as methyl, ethyl, n- and iso-propyl, n-, iso-, sec.- and tert.-butyl, amyl, hexyl, heptyl, octyl, nonyl, decyl, undecyl, dodecyl, and the like, especially $C_{1-6}$ alkyl, more especially lower alkyl, and particularly $C_{1-4}$ alkyl;

straight and branched chain alkenyl having two to 12 carbon atoms such as vinyl, α-alkyl (prop-2-enyl), β-allyl (1-methyl-vinyl), γ-allyl (prop-1-enyl), but-3-enyl, but-2-enyl (crotyl), but-1-enyl, isobutenyl (2-methyl-prop-1-enyl), methallyl (2-methyl-prop-2-enyl), pentenyl, hexenyl, heptenyl, octenyl, nonenyl, decenyl, undecenyl, dodecenyl, and the like, especially $C_{2-6}$ alkenyl, more especially lower alkenyl, and particularly $C_{2-4}$ alkenyl;

such alkyl having one to 12 carbon atoms such as methyl to dodecyl inclusive, and the like, as defined above, which is substituted with lower alkoxy such as methoxy, ethoxy, n- and iso-propoxy, n-, iso-, sec.- and tert.-butoxy, and the like, especially $C_{1-4}$ alkoxy;

lower alkylmercapto such as methyl to tert.-butyl inclusive, and the like, as defined above, -mercapto, especially $C_{1-4}$ alkylmercapto;

lower alkylamino such as methyl to tert.-butyl inclusive, and the like, as defined above, -amino, especially $C_{1-4}$ alkylamino;

dilower alkylamino such as di- and mixed- (same or different) methyl to tert.-butyl inclusive, and the like, as defined above, -amino, especially di-$C_{1-4}$ alkylamino; or One to three halo such as chloro, bromo, iodo and/or fluoro, especially one to three chloro, and more especially chloro-substituted $C_{1-4}$ alkyl;

cycloalkyl having five to eight ring carbon atoms such as cyclo-pentyl, hexyl, heptyl, octyl, and the like, especially $C_{5-6}$ cycloalkyl, and more especially cyclohexyl;

such cycloalkyl having five to eight carbon atoms which is substituted with one to three lower alkyl such as methyl to tert.-butyl inclusive, and the like, as defined above, especially $C_{1-4}$ alkyl;

phenyl lower alkyl such as phenyl substituted-methyl to tert.-butyl inclusive, and the like, as defined above, especially phenyl $C_{1-4}$ alkyl;

phenyl;

substituted phenyl which is substituted with one to three halo as defined above, especially chloro, and more especially monochloro;

nitro;

cyano;

thiocyano (—SCN);

lower alkoxy as defined above, and especially $C_{1-4}$ alkoxy;

lower alkylmercapto as defined above, and especially $C_{1-4}$ alkylmercapto;

lower alkylsulfoxyl such as methyl to tert.-butyl inclusive, and the like, as defined above, -sulfoxyl, and especially $C_{1-4}$ alkylsulfoxyl (-alkyl-SO);

lower alkylsulfonyl such as methyl to tert.-butyl inclusive, and the like, as defined above, -sulfonyl, and especially $C_{1-4}$ alkylsulfonyl (-alkyl $SO_2$); and/or lower alkyl such as methyl to tert.-butyl inclusive, and the like, as defined above, and especially $C_{1-4}$ alkyl;

with the proviso that $R_1$ and $R_2$ when taken with the adjacent nitrogen atom form a heterocyclic ring system with one to three, e.g. fused, rings having a total of three to 14 ring members and one to four hetero linking atoms such as nitrogen, oxygen and/or sulfur including ethylenimino, pyrrolidyl, piperidyl, morpholyl, thiomorpholyl, pyrrolyl, pyrazolyl, imidazolyl, 1,2,3-, 1,2,4-, etc., -triazolyl, 1,2,3,4- and 1,2,3,5-tetrazolyl, indolyl, indazolyl, benzimidazolyl, purinyl (purine), carbazolyl, phenoxazino, etc., and the like, and especially ethylenimino, piperidyl and morpholyl.

Preferably, $R_1$ and $R_2$ each respectively is (same or different) hydrogen, $C_{1-12}$ alkyl, $C_{2-12}$ alkenyl, $C_{5-8}$ cycloalkyl, phenyl or halophenyl, with the proviso that $R_1$ and $R_2$ when taken together with the adjacent nitrogen atom form ethylenimino, piperidyl or morpholyl.

More particularly, $R_1$ is lower alkyl, lower alkenyl, $C_{5-6}$ cycloalkyl, phenyl or chloro-substituted phenyl, and $R_2$ is hydrogen, lower alkyl, lower alkenyl, $C_{5-6}$ cycloalkyl, phenyl or chloro-substituted phenyl, with said proviso that $R_1$ and $R_2$ when taken together with the adjacent nitrogen atom form ethylenimino, piperidyl or morpholyl.

With respect to the new and unobvious compounds of the present invention, these include those in which $R_1$ is $C_{2-12}$ alkenyl, $C_{5-8}$ cycloalkyl, phenyl or halophenyl, and $R_2$ is hydrogen or $C_{1-12}$ alkyl, with said proviso that $R_1$ and $R_2$ when taken together with the adjacent nitrogen atom form ethylenimino, piperidyl or morpholyl. In these new compounds, preferably, $R_1$ is lower alkenyl, $C_{5-6}$ cycloalkyl, phenyl or chloro-substituted phenyl, and $R_2$ is hydrogen or lower alkyl, with said same proviso. In particular, such new compounds contemplate those in which $R_1$ is lower alkenyl, $C_{5-6}$ cycloalkyl, phenyl or chloro-substituted phenyl, and $R_2$ is hydrogen when $R_1$ is lower alkenyl, $C_{5-6}$ cycloalkyl or chloro-substituted phenyl while $R_2$ is lower alkyl when $R_1$ is phenyl, with said same proviso.

The intermediate, 0-methyl-0-(2,2-dichloro-vinyl)- phosphoric acid ester monochloride (IIb), i.e. where Z in formula (Iaa) is chloro, is also contemplated as a new and unobvious compound in accordance with the present invention.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, i.e. both in the specification and claims, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. 0-methyl-0-(2,2-dichloro-vinyl)-phosphoric acid ester monochloride having the formula

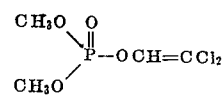

2. Process which comprises reacting 0,0-dimethyl-0-(2,2-dichloro-vinyl)-phosphoric acid ester having the formula

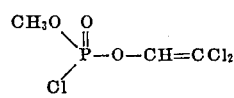

with phosphorus pentachloride at a temperature substantially between about 40°–130° C. to form the corresponding 0-methyl-0-(2,2-dichloro-vinyl)-phosphoric acid ester monochloride having the formula

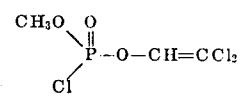

3. Process according to claim 2 wherein said reaction is carried out at a temperature substantially between about 70° to 120° C. using substantially equimolar amounts of said 0,0-dimethyl-0-(2,2-dichloro-vinyl)-phosphoric acid ester and said pentachloride.

4. Process according to claim 2 wherein said monochloride is isolated from the resulting reaction mixture.

5. Process according to claim 2 wherein said 0,0-dimethyl-0-(2,2-dichloro-vinyl)-phosphoric acid ester is admixed with a substantially equimolar amount of phosphorus trichloride in place of said phosphorus pentachloride and substantially about one-half of the calculated corresponding molar amount of molecular chlorine is reacted therewith at said temperature to form said monochloride.

* * * * *

UNITED STATES PATENT OFFICE
CERTIFICATE OF CORRECTION

Patent No. 3626036      Dated December 7, 1971

Inventor(s) Wilhelm Sirrenberg, et al.

It is certified that error appears in the above-identified patent and that said Letters Patent are hereby corrected as shown below:

__Col. 1, line 7__

"o-methyl" should be --0-methyl--

__Col. 4, line 14__

"Omethyl" should be --O-methyl--

__Col. 4, first formula (IIa)__

"$Cl_5$" should be --$PCl_5$--

__second formula (IIb)__

"$OCl_3$" should be --$POCl_3$--

__Col. 5, line 30__

"particular" should be --particularly--

__Col. 6, line 9__

"(iib)" should be --IIb--

__Col. 7, line 53__

"althaeaeor" should be --althaeae or--

UNITED STATES PATENT OFFICE
CERTIFICATE OF CORRECTION

Patent No. 3626036                Dated December 7, 1971

Inventor(s) Wilhelm Sirrenberg, et al.

It is certified that error appears in the above-identified patent and that said Letters Patent are hereby corrected as shown below:

Col. 15, 3d formula ($IX_3$)

"0.02" should be --0.2--

"0.012" should be --0.002--

Col. 15, last formula of Table 6 (formula $IV_6$)

"0.0002" next to last figure in next to last column should be --0.002--

Col. 22, line 3

"$C_{14}$" should be --$C_{1-4}$--

Col. 22, line 5

"α-alkyl" should be --α-allyl--

Signed and sealed this 20th day of June 1972.

(SEAL)
Attest:

EDWARD M. FLETCHER, JR.
Attesting Officer

ROBERT GOTTSCHALK
Commissioner of Patents